US010776839B1

(12) United States Patent
Katta et al.

(10) Patent No.: US 10,776,839 B1
(45) Date of Patent: Sep. 15, 2020

(54) PHOTO TRANSACTIONS FOR FINANCIAL APPLICATIONS

(71) Applicants: Santosh Katta, Bangalore (IN); Kapil Bhalla, New Delhi (IN)

(72) Inventors: Santosh Katta, Bangalore (IN); Kapil Bhalla, New Delhi (IN)

(73) Assignee: Intuit Inc., Mountain View, CA (US)

( * ) Notice: Subject to any disclaimer, the term of this patent is extended or adjusted under 35 U.S.C. 154(b) by 1469 days.

(21) Appl. No.: 14/726,216

(22) Filed: May 29, 2015

(51) Int. Cl.
| | |
|---|---|
| G06Q 30/06 | (2012.01) |
| G06Q 10/06 | (2012.01) |
| G06Q 30/04 | (2012.01) |
| G06K 9/00 | (2006.01) |
| G06K 9/62 | (2006.01) |

(52) U.S. Cl.
CPC ..... *G06Q 30/0611* (2013.01); *G06K 9/00624* (2013.01); *G06K 9/6202* (2013.01); *G06Q 10/06313* (2013.01); *G06Q 30/04* (2013.01); *G06Q 30/0633* (2013.01)

(58) Field of Classification Search
None
See application file for complete search history.

(56) References Cited

U.S. PATENT DOCUMENTS

| | | | | |
|---|---|---|---|---|
| 9,846,885 B1 * | 12/2017 | Sarshar | ............... | G06Q 30/0201 |
| 10,049,397 B1 * | 8/2018 | Patankar | ............. | G06Q 30/0631 |
| 10,332,138 B1 * | 6/2019 | Bruce | ................ | G06Q 30/0206 |
| 2001/0032062 A1 * | 10/2001 | Plaskoff | ............... | G06Q 10/087 |
| | | | | 703/1 |
| 2003/0050976 A1 * | 3/2003 | Block | ................... | H04L 63/105 |
| | | | | 709/203 |
| 2008/0004844 A1 * | 1/2008 | Kefford | ................... | G06F 30/00 |
| | | | | 703/1 |
| 2008/0262900 A1 * | 10/2008 | Duffy | ................. | G06Q 30/0203 |
| | | | | 705/7.32 |
| 2009/0319331 A1 * | 12/2009 | Duffy | ................. | G06Q 30/0201 |
| | | | | 705/7.29 |
| 2010/0114537 A1 * | 5/2010 | Pershing | ................. | G06F 30/13 |
| | | | | 703/1 |
| 2010/0127922 A1 * | 5/2010 | Sooy | .................. | G06Q 30/0205 |
| | | | | 342/357.43 |

(Continued)

OTHER PUBLICATIONS

Colburn, A., Agarwala, A., Hertzmann, A., Curless, B. and Cohen, M.F., 2012. Image-based remodeling. IEEE transactions on visualization and computer graphics, 19(1), pp. 56-66. (Year: 2012).*

Primary Examiner — Eric W Stamber
Assistant Examiner — Matheus Stivaletti
(74) Attorney, Agent, or Firm — Ferguson Braswell Fraser Kubasta PC

(57) ABSTRACT

A method, system, and computer readable medium for automatically generating a job quotation based on a photo image of a completed jobsite. The photo image is analyzed by an online financial application to identify material items used in the completed jobsite. Associated supplemental material items and installation labor hour information are then looked up from a community data repository where other business users have previously contributed relevant information. Accordingly, a quotation to install a jobsite using the material items found in the completed jobsite is generated based on the photo image and information retrieved from the community data repository.

22 Claims, 7 Drawing Sheets

(56) References Cited

U.S. PATENT DOCUMENTS

| | | | | |
|---|---|---|---|---|
| 2010/0186044 A1* | 7/2010 | Yang | ................... | H04W 24/08 |
| | | | | 725/50 |
| 2011/0231233 A1* | 9/2011 | Iannace | .............. | G06Q 30/0224 |
| | | | | 705/14.13 |
| 2013/0103443 A1* | 4/2013 | Ptak | ............... | G06Q 10/063116 |
| | | | | 705/7.13 |
| 2014/0046731 A1* | 2/2014 | Raghupathy | ........ | G06Q 30/0283 |
| | | | | 705/7.35 |
| 2014/0095122 A1* | 4/2014 | Appleman | ............... | G06F 30/13 |
| | | | | 703/1 |
| 2014/0229204 A1* | 8/2014 | Huynh | ............... | G06Q 30/0611 |
| | | | | 705/4 |
| 2014/0258044 A1* | 9/2014 | Chrzan | .............. | G06Q 30/0629 |
| | | | | 705/26.64 |
| 2014/0278730 A1* | 9/2014 | Muhart | .............. | G06Q 10/0635 |
| | | | | 705/7.28 |
| 2015/0142839 A1* | 5/2015 | Ochandio | .............. | G06Q 50/01 |
| | | | | 707/758 |
| 2015/0178861 A1* | 6/2015 | Gordon | ................ | G06Q 10/103 |
| | | | | 705/301 |
| 2016/0132948 A1* | 5/2016 | Saveliev | ............ | G06Q 10/0875 |
| | | | | 705/26.4 |
| 2017/0103441 A1* | 4/2017 | Kolb | ........................ | G06F 16/93 |
| 2017/0169455 A1* | 6/2017 | Dhawan | ............. | G06Q 30/0205 |
| 2017/0244612 A1* | 8/2017 | Balakrishnan | ...... | H04L 41/5009 |
| 2020/0106755 A1* | 4/2020 | Gulbay | ................. | H04L 63/107 |

\* cited by examiner

FIG. 3.1

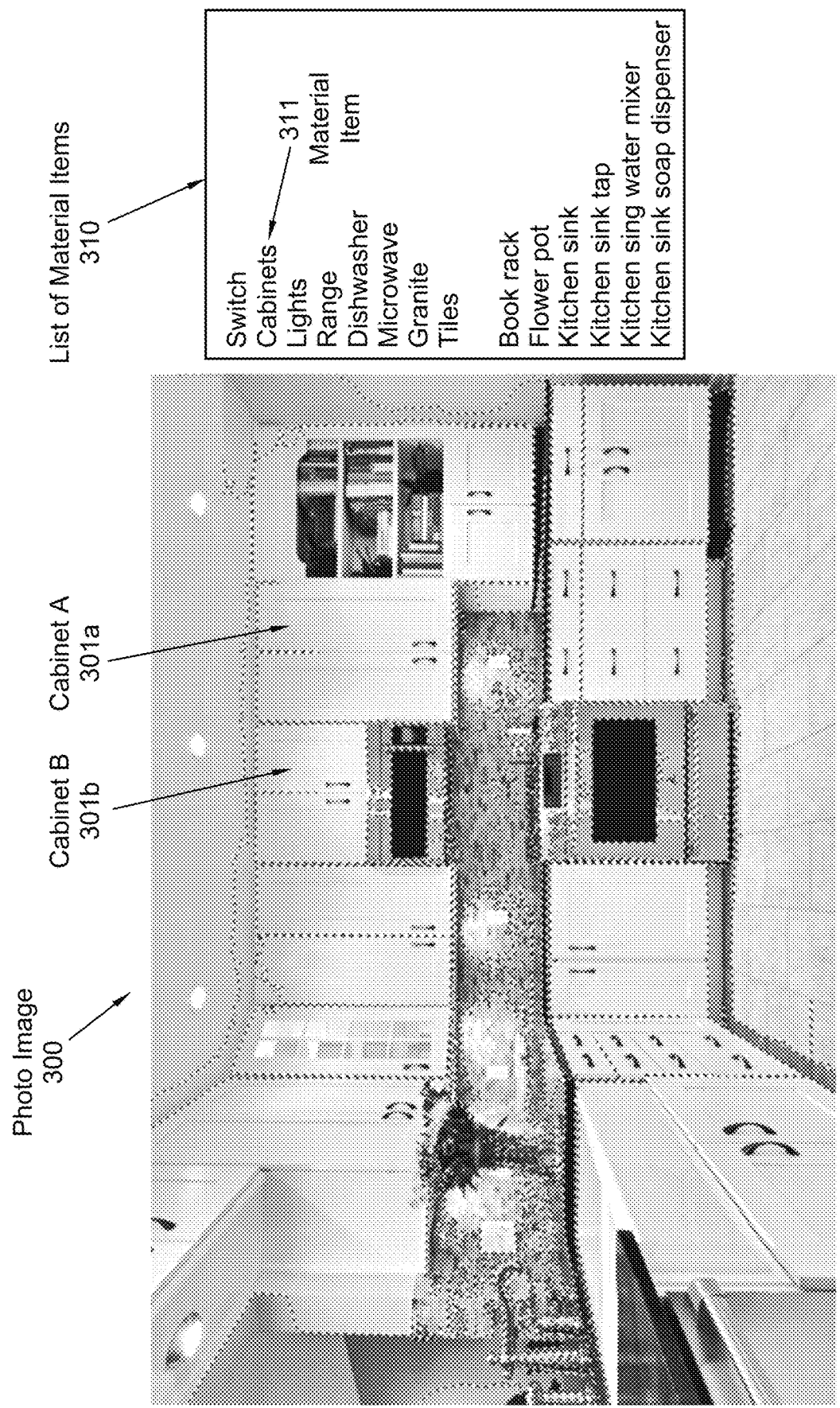
FIG. 3.2

Quotation 330

SanKap Interiors

ESTIMATE

ADDRESS  
John

ESTIMATE # 1001  
DATE 03/13/2015  
EXPIRATION DATE 04/13/2015

| ACTIVITY | | QTY | RATE | AMOUNT |
|---|---|---|---|---|
| Cabinet Door and Handles | Line A 331 | 15 | 50.00 | 750.00 |
| Cabinets | Line B 332 | 8 | 40.00 | 320.00 |
| Cabinet Labor | Line C 333 | 1 | 200.00 | 200.00 |
| Granite Tiles | | 1 | 300.00 | 300.00 |
| Granite Tiles Labor | | 1 | 400.00 | 400.00 |
| Kitchen Sink | | 1 | 100.00 | 100.00 |
| Kitchen Sink Crusher | | 1 | 39.00 | 39.00 |
| Kitchen Sink Fittings and Pipes | | 1 | 85.00 | 85.00 |
| Kitchen Sink Labor | | 1 | 50.00 | 50.00 |
| Kitchen Sink Mixer | | 1 | 25.00 | 25.00 |
| Kitchen Sink Soap Dispenser | | 1 | 15.00 | 15.00 |
| Kitchen Sink Tap | | 2 | 30.00 | 60.00 |
| Light Switch | | 4 | 5.00 | 20.00 |
| Light Switch Fittings & Connectors | | 4 | 6.00 | 24.00 |
| Light Switch Job Service | | 4 | 10.00 | 40.00 |
| Microwave Oven | | 1 | 250.00 | 250.00 |
| Range | | 1 | 500.00 | 500.00 |
| Roof Light | | 4 | 5.00 | 20.00 |
| | TOTAL | | | $3,198.00 |

FIG. 3.3

PHOTO TRANSACTIONS FOR FINANCIAL APPLICATIONS

BACKGROUND

A service business, such as home interior remodeling, plumbing services, etc, often takes on similar jobs from customer to customer. Multiple service businesses with the same service specialty often take on similar jobs for various customers. Although material and labor items for each job are similar among these similar jobs, the service business owners need to prepare a new estimate/invoice for each job based on these similar material and labor items again and again.

SUMMARY

In general, in one aspect, the invention relates to a method for generating a quotation using an online financial application. The method includes capturing, by a mobile device, a photo image of a completed jobsite to send to the online financial application via a network connection, wherein the online financial application is accessed by a vendor using at least the mobile device to record financial transactions associated with jobsite installations, extracting, from the photo image within the online financial application, a list of material items installed at the completed jobsite, retrieving, from a community data repository and based on the list of material items within the online financial application, supplemental material and labor hour information associated with the list of material items, generating, based on the list of material items and the supplemental material and labor hour information within the online financial application, the quotation for a quoted jobsite of a customer, wherein the quoted jobsite is to be installed substantially the same as the completed jobsite, sending, by the online financial application, the quotation to the mobile device, and receiving, by the online financial application in response to sending the quotation to the mobile device, a purchase order from the customer to complete the quoted jobsite.

In general, in one aspect, the invention relates to a system that includes (i) a mobile device of a vendor, wherein the mobile device is configured to capture a photo image of a completed jobsite, send the photo image to an online financial application, and access the online financial application to record financial transactions associated with jobsite installations for the vendor, (ii) a computer processor coupled to the mobile device via a network connection, (iii) memory storing instructions of the online financial application and executable by the computer processor, wherein the instructions comprise (a) a quotation generator configured to extract, from the photo image, a list of material items installed at the completed jobsite, retrieve, based on the list of material items, supplemental material and labor hour information, and generate, based on the list of material items and the supplemental material and labor hour information, a quotation for a quoted jobsite, wherein the quoted jobsite is to be installed substantially the same as the completed jobsite, and (b) a financial management module configured to send the quotation to the mobile device, and receive, in response to sending the quotation to the mobile device, a purchase order to complete the quoted jobsite, and (iii) a community data repository configured to store the supplemental material list and labor hour information.

In general, in one aspect, the invention relates to a non-transitory computer readable medium storing instructions for generating a quotation using an online financial application. The instructions, when executed by a computer processor, include functionality for capturing, by a mobile device, a photo image of a completed jobsite to send to the online financial application via a network connection, wherein the online financial application is accessed by a vendor using at least the mobile device to record financial transactions associated with jobsite installations, extracting, from the photo image within the online financial application, a list of material items installed at the completed jobsite, retrieving, from a community data repository and based on the list of material items within the online financial application, supplemental material and labor hour information associated with the list of material items, generating, based on the list of material items and the supplemental material and labor hour information within the online financial application, the quotation for a quoted jobsite of a customer, wherein the quoted jobsite is to be installed substantially the same as the completed jobsite, sending, by the online financial application, the quotation to the mobile device, and receiving, by the online financial application in response to sending the quotation to the mobile device, a purchase order from the customer to complete the quoted jobsite.

Other aspects of the invention will be apparent from the following transaction description and the appended claims.

BRIEF DESCRIPTION OF DRAWINGS

FIGS. 3.1, 3.2, and 3.3 show an example in accordance with one or more embodiments of the invention.

DETAILED DESCRIPTION

Figure 1A:
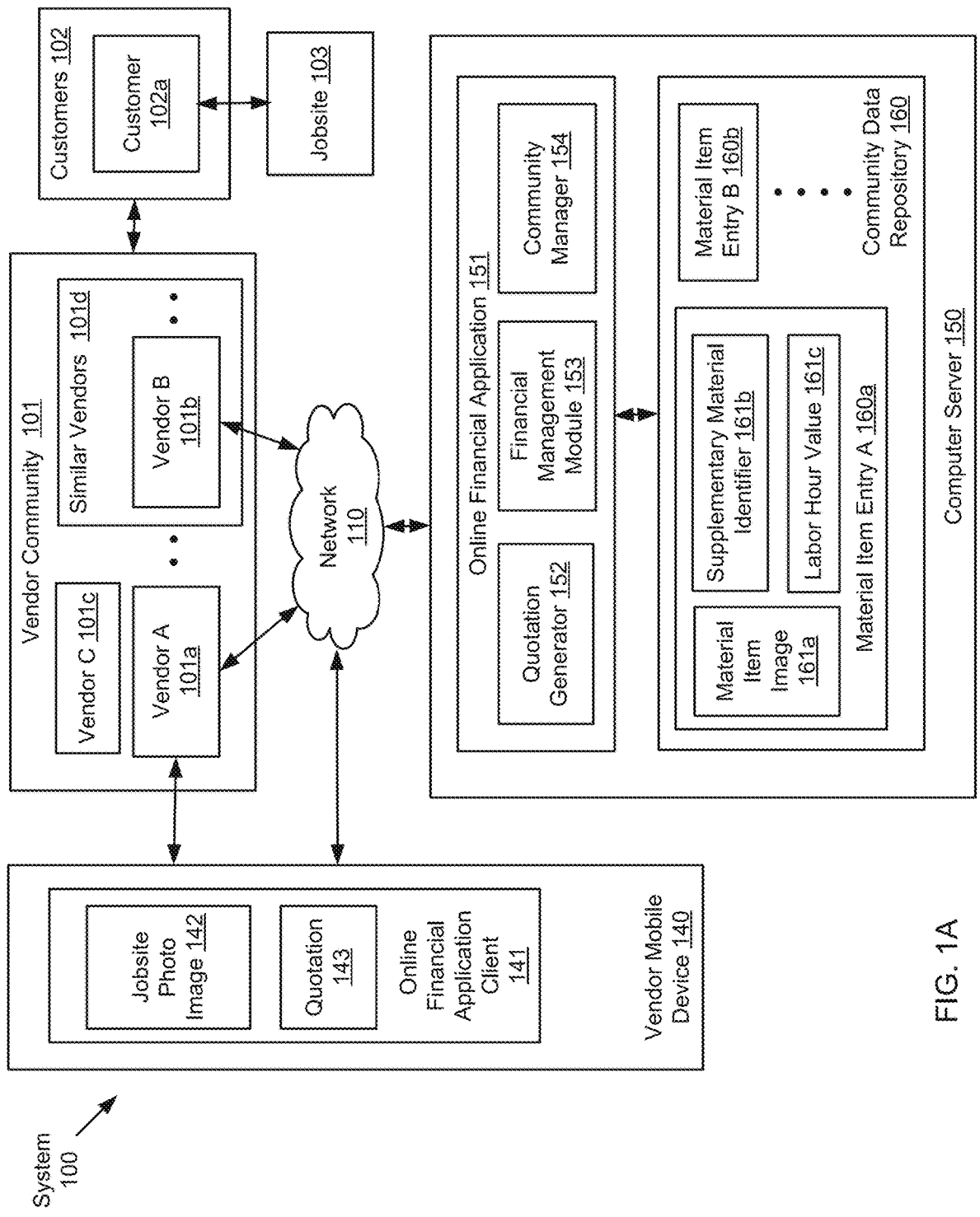
FIGS. 1A and 1B show a block diagram of a system in accordance with one or more embodiments of the invention.

Specific embodiments of the invention will now be described in detail with reference to the accompanying figures. Like elements in the various figures are denoted by like reference numerals for consistency. Further, in the figures, three collinear dots mean that more elements of the same type as before the three collinear dots may optionally exist in accordance with one or more embodiments of the invention.

In the following detailed transaction description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the transaction description.

In general, embodiments of the invention provide a method, system, and computer readable medium for automatically generating a job quotation based on a photo image of a completed jobsite. In one or more embodiments, the photo image is analyzed by an online financial application to identify material items used in the completed jobsite. Associated supplemental material items and installation labor hour information are then looked up from a community data repository where other business users have previously contributed relevant information. Accordingly, a quotation to install a jobsite using the material items found in the completed jobsite is generated based on the photo image and information retrieved from the community data repository.

FIG. 1A shows a system (100) having a vendor mobile device (140), a vendor community (101), customers (102), a jobsite (103), and a computer server (150), in accordance with one or more embodiments of the invention. The vendor mobile device (140) is operated by a vendor A (101a) within the vendor community (101) and is communicatively connected to computer server (150) via a network (110). In one or more embodiments of the invention, the vendor mobile device (140) is installed an online financial application client (141) that is a software module for accessing an online financial application (OFA) (151) executing on the computer server (150). In one or more embodiments of the invention, the OFA (151) includes software components, such as a quotation generator (152), a financial management module (153), and a community manager (154), as well as a community data repository (160). In one or more embodiments of the invention, the network (110) may include a cellular phone network, a wide area network, a local area network, a public switched telephone network (PSTN), a financial network, any other suitable network that facilitates the exchange of information from one part of the network to another, or a combination thereof. In one or more embodiments, the network (110) is coupled to or overlaps with the Internet. In one or more embodiments of the invention, one or more of the modules and elements shown in FIG. 1A may be omitted, repeated, and/or substituted. Accordingly, embodiments of the invention should not be considered limited to the specific arrangements of modules shown in FIG. 1A.

Figure 1B:
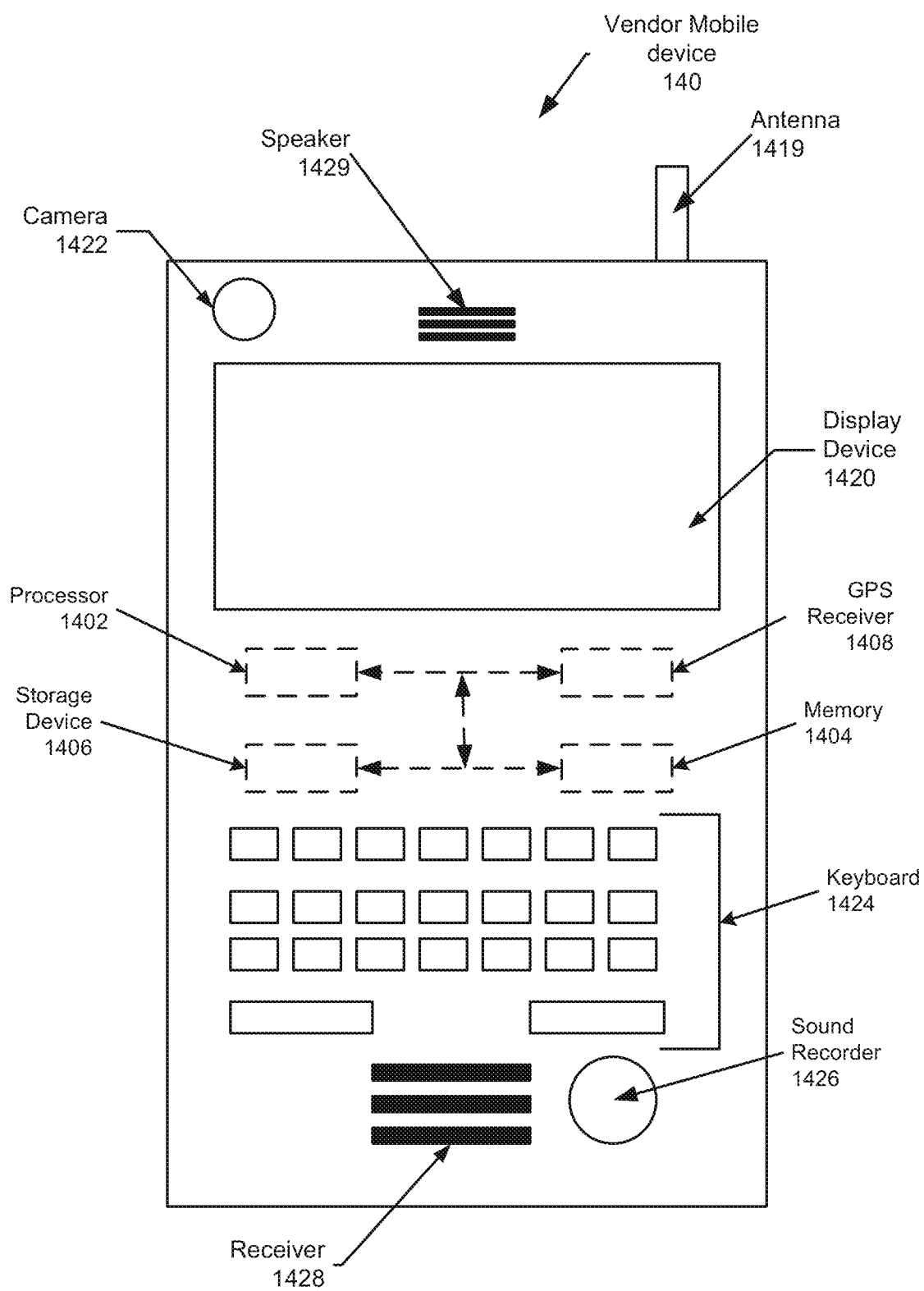

FIG. 1B shows the vendor mobile device (140) in detail, in accordance with one or more embodiments of the invention. Examples of the vendor mobile device (140) may include, but are not limited to, cellular phones, personal digital assistants, personal communicators, pagers, smart phones, e-readers, tablet computers, or any other computing device. In one or more embodiments of the invention, as shown in FIG. 1B, the vendor mobile device (140) may include a processor (1402), memory (1404) (e.g., RAM, cache memory, flash memory, etc.), a storage device (1406) (e.g., a hard disk, an optical drive such as a compact disk drive or digital video disk (DVD) drive, a flash memory stick, etc.), a Global Positioning System (GPS) receiver (1408), a speaker (1429), a receiver (1428), a keyboard (1424), a sound recorder (1426), a display device (1420), a camera (1422), and an antenna (1419), and numerous other elements and functionalities typical of mobile devices (not shown).

The vendor mobile device (140) may include input means and output means, such as the keyboard (1424), the receiver (1428), and/or the display device (e.g., a liquid crystal display screen) (1420), which permits a user (e.g., vendor A (101a)) to enter and/or display keystrokes including numeric, alphabetic, and other characters, images, or other media types. Other input devices may include the camera (1422), the sound recorder (1426), and/or other data recording mechanisms. Those skilled in the art will appreciate that these input and output means may take other forms now known or later developed.

The vendor mobile device (140) may be connected to the network (110) via the antenna (1419) or other network interface connection(s) (not shown). In one or more embodiments of the invention, the network connection may be facilitated by a wireless infrastructure (not shown), including one or more transceivers cooperating to facilitate wireless communications to wireless devices. The wireless infrastructure may include one or more routers, switches, microwave links, base stations, optical fibers, or other similar networking hardware or software components. For example, the wireless infrastructure may be a paging network, a cellular network, etc. In one or more embodiments of the invention, the wireless infrastructure may associate any message received from the vendor mobile device (140) with a mobile device identifier of the vendor mobile device (140).

In one or more embodiments of the invention, the GPS Receiver (1408) includes functionality to obtain one or more location coordinates of the vendor mobile device (140). The vendor mobile device (140) may be configured to use the GPS Receiver (1408) to provide latitude and longitude location coordinates.

Returning to FIG. 1A, in one or more embodiments of the invention, each of the customers (102) (e.g., customer (102a)) is an individual consumer or business consumer. In particular, an individual consumer is a person or group (e.g., family or other organization) that purchases goods and/or services from the vendors (e.g., vendor A (101a), vendor B (101b), vendor C (101c), etc.) in the vendor community (101). A business consumer is a business that purchases goods and/or services from the vendors (e.g., vendor A (101a), vendor B (101b), vendor C (101c), etc.) in the vendor community (101). In one or more embodiments, a customer is associated with a jobsite where a job is performed by a vendor for the customer. The term "job," as used herein, refers to installing and/or applying goods/services at the jobsite. In other words, a jobsite is a customer location (e.g., a home location or a business location) where goods and/or services are to be installed and/or applied by a vendor for the customer. A completed jobsite is a jobsite where a corresponding job has been completed. Examples of a job include an interior remodeling job, a plumbing service job, a landscape installation job, etc. In one or more embodiments, the goods correspond to material items to be installed at the jobsite, while the services correspond to labor hours that will be incurred to install the material items at the jobsite. To perform the job, one or more supplemental material item may be required for a particular material item. For example, a kitchen cabinet used for the interior remodeling job may require one or more cabinet handles that are not included in the kitchen cabinet itself.

In one or more embodiments of the invention, each of the vendors in the vendor community (101) (e.g., vendor A (101a), vendor B (101b), vendor C (101c)) is a business entity engaged in the trade of goods, services, or both to the customers (102). For example, the vendor business entity may be a sole proprietorship, partnership, company, non-profit organization, etc. In one or more embodiments of the inventions, the vendors in the vendor community (101) may deploy the goods and/or services to multiple physical locations (e.g., jobsite (103)) of the customers (102). For example, the goods and/or services deployed to the jobsite (103) may correspond to material items (e.g., a kitchen cabinet or a plumbing part) to be installed at the jobsite (103) and labor quantities (e.g., an hour or a day) allocated to install the material items at the jobsite (103). Further, as used herein, the vendor is deemed to perform an action when the action is performed on behalf of the vendor. For example, an owner, agent, or officer may act on behalf of the vendor to perform an action.

In one or more embodiments of the invention, each of the vendors in the vendor community (101) (e.g., vendor A (101a), vendor B (101b), vendor C (101c)) includes functionality to perform one or more financial transactions with one or more customers among the customers (102). A financial transaction is the exchange of a merchandise item (e.g., a material item or a labor quantity) for payment. A financial transaction may be a sale of a merchandise item, a return of a merchandise item, a down payment on a merchandise item, or any other exchange of merchandise that involve finances. Generally, a financial transaction is represented by a transaction record, which is recorded information regarding the financial transaction. Each transaction record includes a transaction description of the financial transaction. The transaction description describes the financial transaction and may be a concatenation of various components. For example, the transaction description includes information about the vendor, such as a full or abbreviated name of the vendor, a location of the vendor, a store identifier of the vendor, all or part of a web address for the vendor, etc. The transaction description further includes information about the purchased merchandise, such as a name, description, or other identifier of the merchandise, purchase price, purchase date, payment, discount, tax, etc. In one or more embodiments, each of the vendors in the vendor community (101) (e.g., vendor A (101a), vendor B (101b), vendor C (101c)) uses the OFA (151) to organize or otherwise manage the transaction records.

In one or more embodiments of the invention, the OFA (151) is a set of software solutions designed to manage financial transactions and other financial needs of the vendors in the vendor community (101). In one or more embodiments of the invention, the OFA (151) may be an accounting software, a business tax preparation application, or any other types of business financial management application. In one or more embodiments, the OFA (151) is provided by an application service provider, such as a software as a service (SaaS). For example, the OFA (151) may be operated by the application service provider (ASP) and accessed by the vendors in the vendor community (101) on a subscription basis. In one or more embodiments, the OFA (151) (e.g., using the financial management module (153) described below) retrieves transaction records from financial institutions (e.g., bank, credit card service provider, etc.) used by the vendors in the vendor community (101). Further, the OFA (151) stores and organizes the retrieved transaction records under individual financial accounts of the vendors in the vendor community (101). For example, information (i.e., transaction records and other related data) associated with the vendor A (101a) is stored in an individual financial account (not shown) of the vendor A (101a). Similarly, information (i.e., transaction records and other related data) associated with the vendor B (101b) is stored in an individual financial account (not shown) of the vendor B (101b). In one or more embodiments, in addition to the transaction records, the information stored in the individual financial account further include one or more of a vendor profile, a merchandise inventory list, a merchandise price list, a customer list, etc. In one or more embodiments, the vendor profile includes one or more of an industry category, a store name, and a store location of the corresponding vendor.

In one or more embodiments of the invention, the vendor mobile device (140) is configured to access the OFA (151) for the vendor A (101a). In one or more embodiments, the vendor mobile device (140) accesses the OFA (151) using the OFA client (141). For example, the vendor A (101a) may use the vendor mobile device (140) to access the OFA (151) to generate quotations, process purchase orders, and/or record financial transactions associated with jobsite installations of the vendor A (101a).

In one or more embodiments of the invention, the vendor mobile device (140) is further configured to capture and send a photo image (e.g., jobsite photo image (142)) to the OFA (151). In one or more embodiments, the photo image is sent to the OFA (151) using the OFA client (141). In one or more embodiments, using the camera (1422) shown in FIG. 1B above, the jobsite photo image (142) is captured from a completed jobsite (not shown) identified by the customer (102a) or captured from a picture provided by the customer (102a). In particular, the customer (102a) identifies the completed jobsite (not shown) or provides the picture to the vendor A (101a) as a requirement of the goods and/or services to be deployed at the jobsite (103). For example, the completed jobsite may be previously installed with material items (e.g., a kitchen cabinet or a plumbing part) that are desired by the customer (102a) for the jobsite (103). Accordingly, the jobsite photo image (142) is physically captured by the vendor A (101a) using the vendor mobile device (140) at the completed jobsite (not shown) as requested by the customer (102a). In another example, the completed jobsite (not shown) may be described in a magazine showing the picture containing material items that are desired by the customer (102a) for the jobsite (103). Accordingly, the picture in the magazine is provided by the customer (102a) to the vendor A (101a) who in turn uses the vendor mobile device (140) to capture the jobsite photo image (142) from the picture.

In one or more embodiments of the invention, the community data repository (160) may include a disk drive storage device, a semiconductor storage device, a database management system, other suitable computer data storage device, or combinations thereof. In one or more embodiments, content stored in the community data repository (160) may be a data file, a linked list, a data sequence, a database, a graphical representation, or any other suitable data structure. In one or more embodiments of the invention, the community data repository (160) includes functionality to store data for the OFA (151). The data stored in the community data repository (160) includes material item entries (e.g., material item entry A (160a), material item entry B (160b), etc.) contributed by venders in the vendor community (101) as well as aforementioned individual financial accounts (not shown) of the vendors in the vendor community (101). In one or more embodiments, a material item entry includes information regarding a particular material item (e.g., a kitchen cabinet). In particular, the material item entry is indexed in the community data repository (160) based on a material item identifier that identifies the particular material item. For example, the material item identifier may identify a model, a brand, a manufacturer part number and/or other types of the particular material item. In one or more embodiments, information stored in the material item entry is contributed by a member of the vendor community (101). For example, the material item entry A (160a) includes multiple elements, such as the material item image (161a), the supplemental material identifier (161b), and the labor hour value (161c) that are contributed by the vendor B (101b). Specifically, the material item image (161a) is an image of the particular material item (e.g., a kitchen cabinet) previously installed by the vendor B (101b). The supplemental material identifier (161b) identifies a supplemental material item (e.g., a cabinet handle) previously used by the vendor B (101b) when installing the particular material item (e.g., a kitchen cabinet). The labor hour value (161c) corresponds to an installation time previously incurred by the vendor B (101b) when installing the particular material item (e.g., a kitchen cabinet). Although not explicitly shown, the material item entry B (160b) includes similar types of elements as the material item entry A (160a).

In one or more embodiments of the invention, the OFA (151) includes the community manager (154) that is configured to assign a community member status to an individual financial account maintained by the OFA (151) on behalf of a vendor (e.g., vendor A (101a), vendor B (101b), vendor C (101c)). Accordingly, the vendor (e.g., vendor A (101a), vendor B (101b), vendor C (101c)) becomes a member of the vendor community (101) based on the assigned community member status and is authorized to access member-contributed information (e.g., material item entry A (160a), etc.) stored in the community data repository (160). In one or more embodiments, the community manager (154) assigns the community member status based on a request from the vendor (e.g., vendor A (101a), vendor B (101b), vendor C (101c)) to join the vendor community (101). In one or more embodiments, the request is associated with an agreement by the vendor to rules and good faith practices (e.g., regarding accessing member-contributed information, fees, or other aspects of information sharing) of the vendor community (101). In one or more embodiments of the invention, the community manager (154) is further configured to authorize the vendor for accessing functionalities of the quotation generator (152) and the financial management module (153). Specifically, the community manager (154) verifies the community member status of the vendor prior to the vendor accessing functionalities of the quotation generator (152) and the financial management module (153).

In one or more embodiments of the invention, the community manager (154) is further configured to obtain the vendors' transaction records and profile information from the OFA (151) for comparison to identify similar vendors. For example, the similar vendors (101d) may include a group of vendors that are similar to the vendor A (101a). In another example, the similar vendors (101d) include a group of vendors that are similar to the vendor C (101c) but are not similar to the vendor A (101a). In one or more embodiments, the community manager (154) retrieves or otherwise obtains the information of the vendor A (101a) and other vendors (referred to as target vendors in the context of comparison) from the OFA (151) for comparison. In one or more embodiments, the retrieved information of the vendor A (101a) is compared to the retrieved information of each target vendor (e.g., vendor B (101b)) to generate a similarity measure for each target vendor. For example, the level of similarity may correspond to similarity in the merchandise inventory list, the merchandise price list, the customer list, the customer transaction statistics, the industry category, the skill level for a particular job category, the store name, the store location, etc. of the vendor A (101a) and the target vendor (e.g., vendor B (101b)). The vendor similarity measure may be a numeric score, a letter score, a percentage, etc. In one or more embodiments, a target vendor (e.g., vendor B (101b)) is considered as a similar vendor to the vendor A (101a) if the vendor similarity measure meets a pre-determined criterion. For example, the vendor similarity measure may be compared to a minimum threshold to qualify the vendor B (101b) as a similar vendor to the vendor A (101a). In one or more embodiments, multiple vendors may be qualified as being similar to the vendor A (101a) and are collectively referred to as the similar vendors (101d). In one or more embodiments, the vendor A (101a) and the vendor C (101c) are not similar to each other based on the vendor similarity measure. Accordingly, multiple vendors may be qualified as being similar to the vendor C (101c) but not similar to the vendor A (101a) and are collectively referred to as the similar vendors (101d). For example, the vendor B (101b) is included in the similar vendors (101d) because the vendor B (101b) is similar to the vendor C (101c) but not the vendor A (101a).

In one or more embodiments, the vendor similarity measure may be generated further based on information regarding the customers of the vendor A (101a) and the customers of the vendor B (101b). For example, the community manager (154) may identify the customers of the vendor A (101a) and the vendor B (101b) based on customer lists and/or transaction records maintained by the OFA (151). Once the customers of the vendor A (101a) and the vendor B (101b) are identified, the information associated with the customers may be retrieved from an online personal financial management application (not shown) for comparison. Accordingly, the similarity between customer information of the vendor A (101a) and the vendor B (101b) is determined and included as part of the vendor similarity measure.

In one or more embodiments of the invention, the OFA (151) includes the quotation generator (152) that is configured to extract, from the jobsite photo image (142), a list of material items installed at the completed jobsite (not shown). In one or more embodiments, the quotation generator (152) analyzes the jobsite photo image (142) to identify a portion that matches the material item image (161a) in the material item entry A (160a). Accordingly, the corresponding material item is included in the list of material items installed at the completed jobsite (not shown). For example, the material item identifier of the corresponding material item is inserted into the list of material items.

In one or more embodiments of the invention, the quotation generator (152) is further configured to retrieve, based on the list of material items, a supplemental material list and labor hour information. In one or more embodiments, in response to including, in the list of material items, the material item corresponding to the material item image (161a), the supplemental material identifier (161b) is retrieved from the material item entry A (160a) and included in the supplemental material list. Further, the labor hour value (161c) is also retrieved from material item entry A (160a) to be accumulated for computing a total labor hour.

In one or more embodiments of the invention, the quotation generator (152) is further configured to generate, based on the list of material items, the supplemental material list, and the total labor hour, a quotation for the jobsite (103). In particular, the quotation includes a price offered by the vendor A (101a) to perform a job at the jobsite (103) substantially the same as the completed jobsite that is represented by the jobsite photo image (142).

In one or more embodiments of the invention, the quotation generator (152) is further configured to receive a quotation adjustment from the vendor A (101a) to adjust the quotation. For example, to adjust the quotation, the vendor A (101a) may adjust the supplemental material identifier (161b) in the supplemental material list and/or the labor hour value (161c) included in the total labor hour to correct an error identified by the vendor A (101a). In another example, to adjust the quotation, the vendor A (101a) may replace the supplemental material identifier (161b) in the supplemental material list by a different supplemental material identifier corresponding to a newer, improved, and/or more available supplemental material item. Accordingly, the vendor A (101a) may also adjust the corresponding labor hour value (161c) included in the total labor hour. In yet another example, to adjust the quotation, the vendor A (101a) may adjust the corresponding labor hour value (161*c*) included in the total labor hour based on a labor skill level specific to the vendor A (101*a*). In particular, the labor hour value (161*c*) may be contributed by the vendor B (101*b*) with more skilled labor in a job category than the vendor A (101*a*). For example, the vendor A (101*a*) may be a new vendor in the job category.

In one or more embodiments of the invention, the quotation generator (152) is further configured to update the community data repository (160) based on the quotation adjustment. For example, the material item entry A (160*a*) may be revised based on the adjustment described above. In another example, an additional material item entry (e.g., material item entry B (160*b*)) may be added in the community data repository (160) based on the adjustment described above. The additional material item entry (e.g., material item entry B (160*b*)) and the material item entry A (160*a*) may be linked as alternative choices or different versions of the same material item and associated with the same material item identifier. For example, the material item entry A (160*a*) may be applicable to vendors similar (e.g., with similar skill level or in the same geographical region) to the vendor B (101*b*), while the additional material item entry (e.g., material item entry B (160*b*)) may be applicable to vendors similar (e.g., with similar skill level or in the same geographical region) to the vendor A (101*a*). In one or more embodiments, to generate a quotation for the vendor C (101*c*), the quotation generator (152) selects an applicable material item entry (e.g., one of the material item entry A (160*a*) and the material item entry B (160*b*)) from the community data repository (160) based on similarity of the vendor C (101*c*) as compared to the vendor A (101*a*) or the vendor B (101*b*). For example, if the vendor C (101*c*) is similar to the vendor B (101*b*), the material item entry A (160*a*) is retrieved and used to generate the quotation for the vendor C (101*c*). In contrast, if the vendor C (101*c*) is similar to the vendor A (101*a*), the material item entry B (160*b*) is retrieved and used to generate the quotation for the vendor C (101*c*). In this manner, the labor hour value retrieved from the applicable material item entry corresponds to similar skill level of similar vendors. In the same manner, the supplementary material identifier retrieved from the applicable material item entry corresponds to available supplementary material items in the geological region of similar vendors.

In one or more embodiments of the invention, the OFA (151) includes the financial management module (154) that is configured to send the quotation to the vendor mobile device (140). In one or more embodiments, the quotation is received as the quotation (143) by the vendor mobile device (140) using the OFA client (141). In response to sending the quotation to the vendor mobile device (140), a purchase order is received to complete the quoted job at the jobsite (103). For example, within a short time period (e.g., 1 minute, 10 minutes, half an hour, etc.) after the jobsite photo image (142) is captured by the vendor mobile device (140) and sent to the OFA (151), the vendor A (101*a*) is able to present the quotation (143) to the customer (102*a*). This facilitates the vendor A (101*a*) to finalize an agreement with the customer (102*a*) to perform the quoted job at the jobsite (103). As a result, the customer (102*a*) signs the quotation (143) to convert the quotation (143) into a purchase order. For example, the customer (102*a*) may sign the quotation (143) displayed on the vendor mobile device (140) using a touch interface of the vendor mobile device (140). Accordingly, the OFA client (141) automatically converts the signed quotation into the purchase order for sending to the OFA (151).

In response to receiving the purchase order and upon the vendor A (101*a*) completing the quoted job at the jobsite (103), the financial management module (153) is further configured to generate an invoice that includes a payment amount corresponding to the supplemental material item and the labor hour value that were used in generating the quotation. Accordingly, the invoice is sent to the customer (102*a*) for collecting the payment amount. In one or more embodiments, the vendor A (101*a*) reviews and sends the invoice using the vendor mobile device (140).

Figure 2:
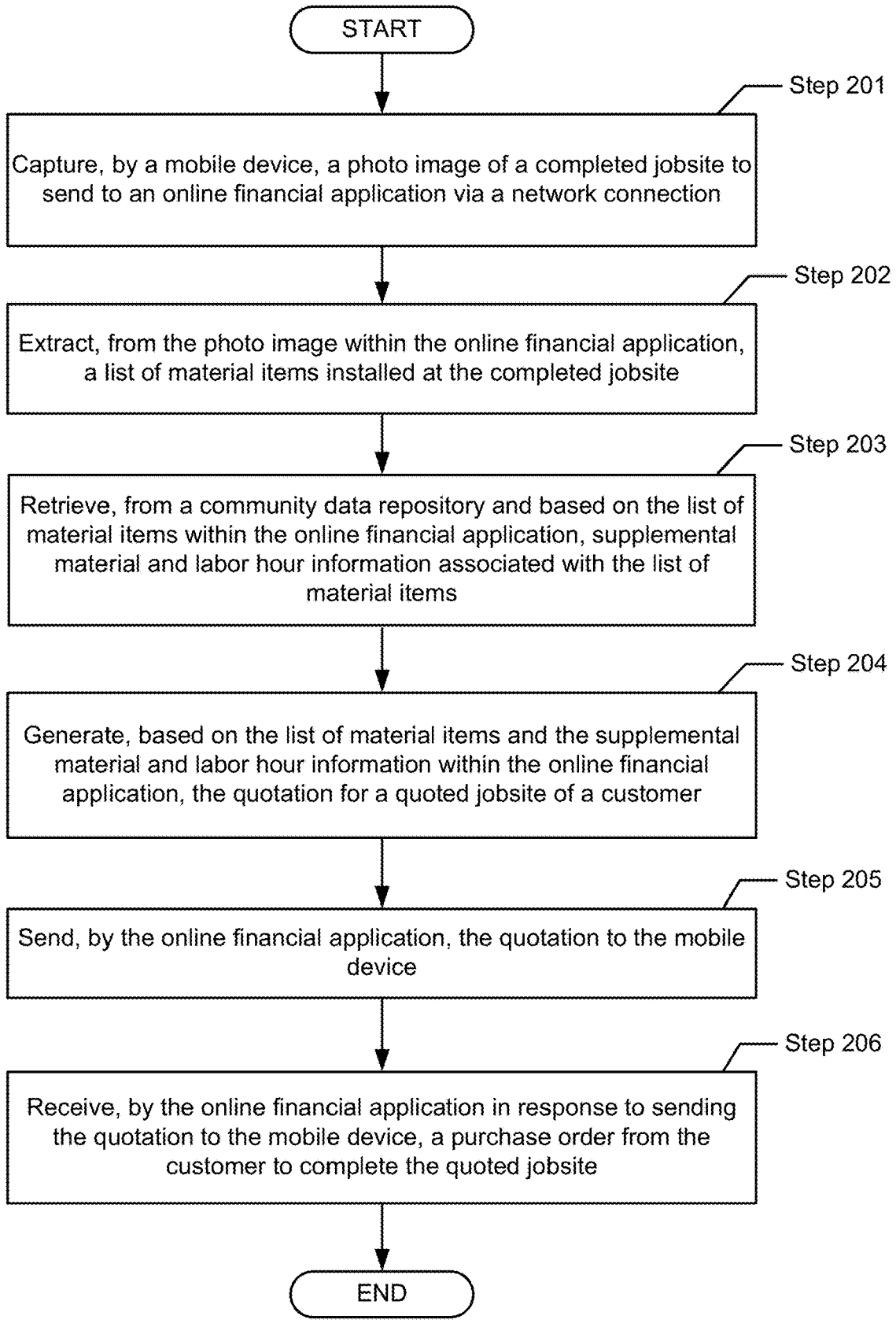
FIG. 2 shows a flowchart in accordance with one or more embodiments of the invention.

FIG. 2 shows a flowchart in accordance with one or more embodiments of the invention. In one or more embodiments of the invention, the method of FIG. 2 may be practiced using the system (100) described in reference to FIG. 1 above. In one or more embodiments of the invention, one or more of the steps shown in FIG. 2 may be omitted, repeated, and/or performed in a different order than that shown in FIG. 2. Accordingly, the specific arrangement of steps shown in FIG. 2 should not be construed as limiting the scope of the invention.

Initially, in Step 201, a photo image of a completed jobsite is captured by a mobile device of a vendor to send to an online financial application via a network connection. In one or more embodiments of the invention, the online financial application is accessed by the vendor using the mobile device to record financial transactions associated with jobsite installations.

In one or more embodiments of the invention, capturing the photo image is by photographing the completed jobsite using a camera of the mobile device. In one or more embodiments of the invention, capturing the photo image is by obtaining an existing image, such as a previously photographed image or a shared image.

In Step 202, a list of material items installed at the completed jobsite is extracted from the photo image. In one or more embodiments of the invention, the list of material items is extracted within the online financial application where the photo image is compared to material item images stored in a community data repository. Specifically, a portion of the photo image is matched to one of the material item images stored in the community data repository to identify a material item to be added to the list of material items. For example, the matching may be performed using image and pattern recognition techniques, e.g., based on OpenCV (Open Source Computer Vision), Gabor filter, etc. Generally, multiple material items are added to the list by matching multiple portions of the photo images to respective material item images stored in the community data repository. For example, the multiple portions are non-overlapping portions. In one or more embodiments of the invention, the material item images are previously contributed to the community data repository by members in a vendor community. In one or more embodiments, a community member status of the vendor is verified before the list of material items is extracted from the photo image. In other words, the vendor is authorized based on the community member status to access the community data repository for extracting the list of material items based on member-contributed material item images.

In Step 203, supplemental material and labor hour information associated with each material item in the list of material items are retrieved from the community data repository. In one or more embodiments of the invention, the supplemental material and labor hour information includes a supplemental material item associated with the material item and a labor hour value representing a time amount needed to install the material item.

In one or more embodiments of the invention, the supplemental material item and the labor hour value are previously contributed to the community data repository by members in the vendor community. In one or more embodiments, the community member status of the vendor is verified before the supplemental material and labor hour information are retrieved from the community data repository. In other words, the vendor is authorized based on the community member status to access the community data repository for retrieving the supplemental material and labor hour information.

In one or more embodiments of the invention, multiple entries of the supplemental material and labor hour information are associated with a single material item in the community data repository. In particular, the multiple entries of the supplemental material and labor hour information are contributed by multiple respective members of the vendor community. In one or more embodiments, a particular entry is selected from the multiple entries of the supplemental material and labor hour information associated with the single material item. Accordingly, the particular entry being selected is retrieved while the other entries not selected are not retrieved for the vendor. Specifically, the selection is based on a similarity between the vendor using the mobile device to capture the photo image and a particular member of the vendor community who contributed the particular entry to the community data repository. For example, the similarity may be based on geographical region served by the vendor, the skill level of the vendor, the quality level of the vendor, etc.

In Step 204, a quotation for a quoted jobsite of a customer is generated based on the list of material items and the supplemental material and labor hour information. In one or more embodiments of the invention, the quotation requires that the quoted jobsite is to be installed by the vendor substantially the same as the completed jobsite. In other words, the quoted jobsite is to be installed using same types (e.g., models or brands) of material items found in the photo image of the completed jobsite.

In one or more embodiments of the invention, prior to finalizing the quotation, an adjustment by the vendor to adjust the supplemental material and labor hour information is received by the online financial application. In particular, the supplemental material and labor hour information that are associated with one or more material items are adjusted. Accordingly, the quotation is updated by the online financial application based on the adjustment to generate an update quotation. In one or more embodiments, generating the update quotation is authorized based on the community member status of the vendor.

In one or more embodiments of the invention, the community data repository is updated by the online financial application based on the adjustment by the vendor to the supplemental material and labor hour information. Specifically, the supplemental material item and the labor hour value that are associated with the one or more material items are updated based on the adjustment. In one or more embodiments, updating the community data repository is authorized based on the community member status of the vendor.

In Step 205, the quotation, after updating if any, is sent by the online financial application to the mobile device of the vendor. Accordingly, the vendor presents the quotation to the customer. In one or more embodiments of the invention, the quotation is sent by the online financial application to the mobile device of the vendor within a short time period (e.g., 1 minute, 10 minutes, half an hour, etc.) after the photo image of the completed jobsite is captured by the mobile device of the vendor. In particular, the short time period is only limited by wireless data transmission delay between the mobile device and a server executing the online financial application, and the computing time required by the server to analyze the photo image based on member contributed information in the community data repository. In other words, any manual delay of human activity is removed from the response time between capturing the photo image, as directed by the customer, to presenting the quotation to the customer. This effectively facilitates the vendor to finalize an agreement with the customer to perform the job at the quoted jobsite.

In Step 206, in response to sending the quotation to the mobile device, a purchase order is received by the online financial application from the customer to complete the quoted jobsite. In one or more embodiments of the invention, the customer signs the quotation to convert the quotation into a purchase order. For example, the customer may sign the quotation displayed on the mobile device of the vendor using a touch interface of the mobile device. Accordingly, the signed quotation is automatically converted into the purchase order for sending to the online financial application.

In one or more embodiments of the invention, in response to receiving the purchase order and completing the job, an invoice is generated and sent to the customer. In particular, the invoice includes a payment amount corresponding to the supplemental material item and the labor hour value associated with each material item in the list of material items extracted from the photo image. In one or more embodiments, the community data repository is further updated based on the payment amount. For example, subsequent to generating the quotation, receiving the purchase order, and based on the actual installation of the material item, the vendor may further adjust the supplemental material item and the labor hour value for calculating the payment amount in the invoice. Accordingly, the supplemental material item and the labor hour value stored in the community data repository may be updated based on the further adjustment.

FIGS. 3.1, 3.2, and 3.3 show an example in accordance with one or more embodiments of the invention. In one or more embodiments of the invention, the example may be practiced using the system (100) of FIG. 1 and the method of FIG. 2. The example is for illustration only. Accordingly, the specific arrangement of components shown in FIGS. 3.1, 3.2, and 3.3 should not be construed as limiting the scope of the invention.

Specifically, FIGS. 3.1, 3.2, and 3.3 show an example of a small business "Sankap Interiors" (owned and operated by the owner "Sankap") that specializes in home interior work for households. Sankap Interiors is a new vendor in the interior installation/remodeling business and uses a financial management application "ABC Accounting" to organize the interior installation/remodeling business records, such as quotations, purchase orders, expenses, payrolls, invoices, etc. ABC Accounting has a new feature that helps Sankap to sign up customers quickly in an interactive approach. A potential customer John calls the SanKap for a home visit to provide an estimate to install kitchen interiors in his new house (i.e., the quoted jobsite). During the home visit, John provides a picture (As shown in FIG. 3.1) of the kitchen at his friend Mary's house (i.e., the completed jobsite) and requests that Sankap does something similar for him as well.

Sankap takes a scan of the picture (e.g., photo image (300)) shown in FIG. 3.1 and inputs the scanned photo image into ABC Accounting, which quickly extracts a list of materials shown in FIG. 3.2. Based on the list of materials shown in FIG. 3.2, ABC Accounting quickly creates a quotation shown in FIG. 3.3 that is used for discussion with John.

FIG. 3.2 shows the photo image (300) that is scanned into ABC Accounting by Sankap and the list of material items (310) that is extracted from the photo image (300) by ABC Accounting. For example, the photo image (300) includes a number of components (or portions) corresponding to a number of kitchen cabinets, such as the cabinet A (301a) and cabinet B (301b). Correspondingly, the list of material items includes an entry (i.e., material item (311)) that represents these kitchen cabinets. In the example shown in FIG. 3.2, the list of material items (310) is a hierarchical list. While multiple kitchen cabinets of different form factors are depicted in the photo image (300), the cabinet A (301a), cabinet B (301b), and other kitchen cabinets are collectively represented as the material item (311) in the list of material items (310). In particular, the material item (311) may be expended (e.g., in response to a user input) to a lower hierarchical level to show individual kitchen cabinets each identified by respective dimensions.

FIG. 3.3 shows the quotation (330) that is generated by ABC Accounting for Sankap to present to John for discussion. The quotation (330) includes the line B (332) corresponding to the cabinets of material item (311) in the list of material items (310). The quotation (330) also includes the line A (331) corresponding to cabinet doors and handles that are supplemental material items found in a community data repository to be associated with the cabinets of the material item (311). In particular, the community data repository is shared by business users of ABC Accounting and stores member-contributed information used by ABC Accounting to analyze jobsite photo images and generate quotations. In addition, the quotation (330) includes line C (333) corresponding to the labor hour for installing the cabinets with the doors and handles. When ABC Accounting checks the community data repository to identify supplemental material and labor information, more than one entry are found that include one entry contributed by a luxury interior vendor and another entry contributed by a economic interior vendor. John has requested a luxury kitchen with high quality components just like his friend Mary's kitchen. As a result, the supplemental material and labor information entry contributed to the community data repository by the luxury interior vendor is selected for generating the quotation (330). Because of efficiency of automatically generating the quotation by analyzing the photo image of Mary's kitchen based on information in the community data repository contributed by similar vendors like Sankap Interiors, Sankap is able to present the quotation within five minutes into the hour long appointment with John. At the end of the hour long appointment, John signed the quotation after two modifications are made by Sankap to substitute two cabinet doors that are no longer available from the same manufacturer specified in the supplemental material and labor information entry in the community data repository. After John comes back to the office, he reviews the signed quotation that is now converted by ABC Accounting into the purchase order and submits an update to the community data repository based on his modification of the two cabinet doors in the quotation. It turns out the original manufacturer's cabinet doors are available where Mary's house is but not in the area where John's house is located.

Figure 4:
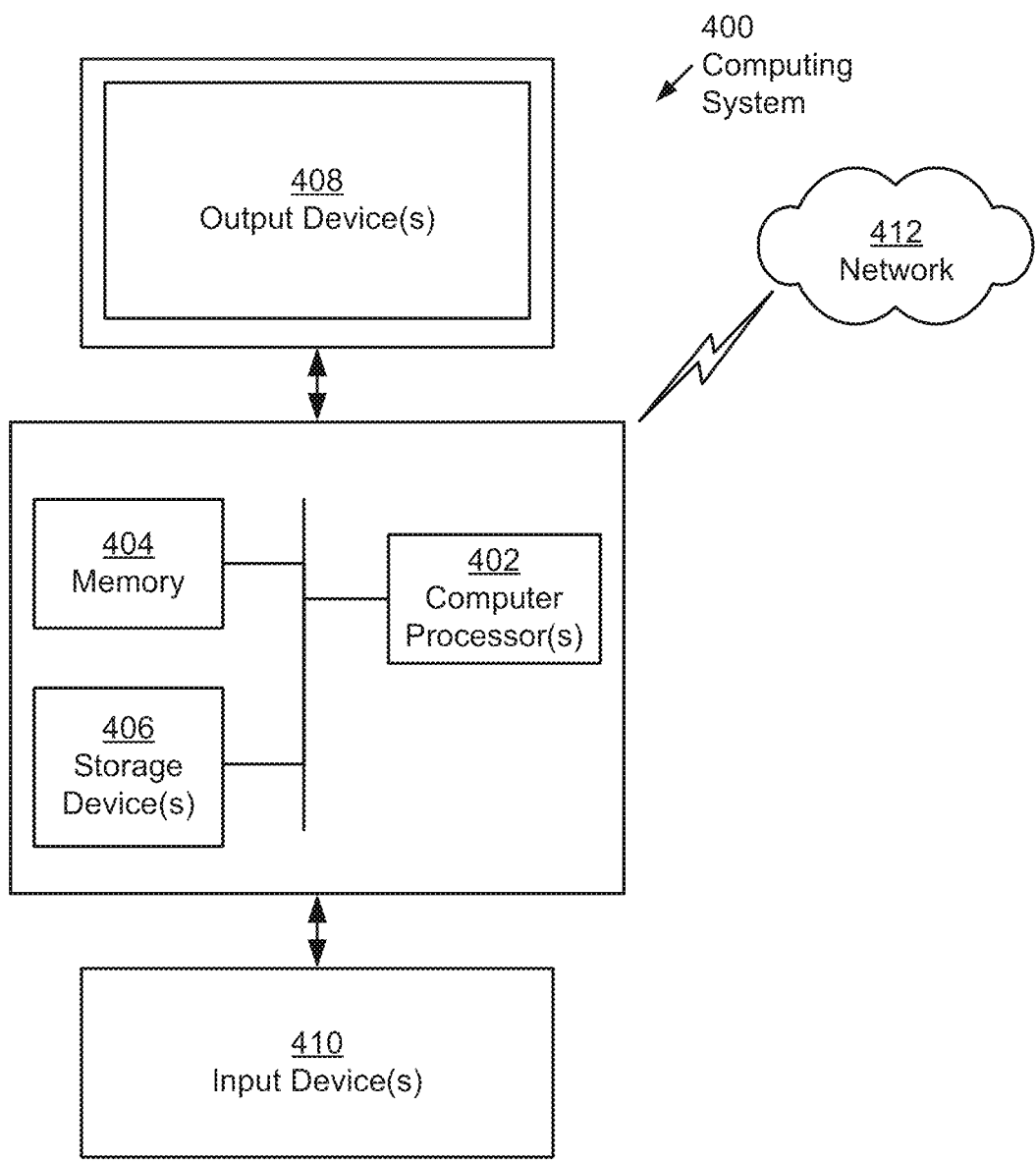
FIG. 4 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device. The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating a quotation using an online application, comprising:
receiving, via a network connection and at an online application executing on a computer server, a captured photo image of a completed jobsite,
wherein the completed jobsite comprises a jobsite where a corresponding job has already been completed,
wherein the captured photo image of the completed jobsite shows a requirement of at least one of goods and services to be deployed at a quoted jobsite of a customer, and
wherein the quoted jobsite comprises a jobsite where work is to be performed;
extracting, from the captured photo image within the online application, a list of material items installed at the completed jobsite;
retrieving, from a community data repository and based on the list of material items within the online application, supplemental material and labor hour information associated with the list of material items;
generating, based on the list of material items and the supplemental material and labor hour information within the online application, the quotation for the quoted jobsite of the customer, wherein the quoted jobsite is to be installed substantially the same as the completed jobsite; and
sending, by the online application, the quotation to a remote device.

2. The method of claim 1, further comprising:
assigning, based on an input of the vendor, a community member status to an account maintained by the online application on behalf of the vendor; and
verifying, prior to generating the quotation, the community member status, wherein generating the quotation is authorized based on the community member status.

3. The method of claim 2, further comprising:
receiving, by the online application, an adjustment by the vendor to adjust the supplemental material and labor hour information; and
updating, by the online application and based on the adjustment, the quotation to generate an update quotation,
wherein generating the update quotation is authorized based on the community member status, and
wherein the purchase order is based on the updated quotation.

4. The method of claim 3, further comprising:
updating, by the online application and based on the adjustment, the community data repository,
wherein updating the community data repository is authorized based on the community member status.

5. The method of claim 4,
wherein extracting the list of material items comprises comparing the photo image to a reference image of a material item in the list of material items to determine a match, and
wherein retrieving the supplemental material and labor hour information comprises retrieving a supplemental material item and a labor hour value associated with the material item based on the match.

6. The method of claim 5,
wherein updating the community data repository comprised updating the supplemental material item and the labor hour value based on the adjustment.

7. The method of claim 6, further comprising:
generating, in response to receiving the purchase order, an invoice comprising a payment amount corresponding to the supplemental material item and the labor hour value;
sending the invoice to the customer for collecting the payment amount; and
further updating the community data repository based on the payment amount.

8. The method of claim 1, further comprising:
receiving, by the online financial application in response to sending the quotation to the remote device, a purchase order from the customer to complete the quoted jobsite.

9. A system comprising:
a mobile device of a vendor, wherein the mobile device is configured to:
capture a photo image of a completed jobsite;
wherein the completed jobsite comprises a jobsite where a corresponding job has already been completed,
wherein the captured photo image of the completed jobsite shows a requirement of at least one of goods and services to be deployed at a quoted jobsite of a customer, and
wherein the quoted jobsite comprises a jobsite where work is to be performed;
send the photo image to an online financial application; and
access the online financial application to record financial transactions associated with jobsite installations for the vendor;
a computer processor coupled to the mobile device via a network connection;
memory storing instructions of the online financial application and executable by the computer processor, wherein the instructions comprise:
a quotation generator configured to:
extract, from the photo image, a list of material items installed at the completed jobsite;
retrieve, based on the list of material items, supplemental material and labor hour information; and
generate, based on the list of material items and the supplemental material and labor hour information, a quotation for the quoted jobsite,
wherein the quoted jobsite is to be installed substantially the same as the completed jobsite; and
a financial management module configured to:
send the quotation to the mobile device; and
receive, in response to sending the quotation to the mobile device, a purchase order to complete the quoted jobsite; and
a community data repository configured to store the supplemental material list and labor hour information.

10. The system of claim 9, the instructions further comprising a community manager configured to:
assign, based on an input of the vendor, a community member status to an account maintained by the online financial application on behalf of the vendor; and
verify, prior to generating the quotation, the community member status,
wherein the quotation and the purchase order are organized by the online financial application based on the account, and
wherein generating the quotation is authorized based on the community member status.

11. The system of claim 10, the quotation generator further configured to:
receive an adjustment by the vendor to adjust the supplemental material and labor hour information; and
update, based on the adjustment, the quotation to generate an updated quotation,
wherein generating the update quotation is authorized based on the community member status, and
wherein the purchase order is based on the updated quotation.

12. The system of claim 11, the quotation generator further configured to:
update, based on the adjustment, the community data repository,
wherein updating the community data repository is authorized based on the community member status.

13. The system of claim 12,
wherein extracting the list of material items comprises comparing the photo image to a reference image of a material item in the list of material items to determine a match, and
wherein retrieving the supplemental material and labor hour information comprises retrieving a supplemental material item and a labor hour value associated with the material item based on the match.

14. The system of claim 13,
wherein updating the community data repository comprised updating the supplemental material item and the labor hour value based on the adjustment.

15. The system of claim 14, the financial management module further configured to:
generate, in response to receiving the purchase order, an invoice comprising a payment amount corresponding to the supplemental material item and the labor hour value;
send the invoice to a customer for collecting the payment amount; and
further update the community data repository based on the payment amount.

16. A non-transitory computer readable medium storing instructions for generating a quotation using an online financial application, the instructions, when executed by a computer processor, comprising functionality for:
receiving, via a network, a captured image captured by a remote device, a photo image of a completed jobsite,
wherein the online financial application is accessible by a vendor using at least the remote device to record financial transactions associated with jobsite installations,
wherein the completed jobsite comprises a site where a corresponding job has been completed;
wherein the captured image of the completed jobsite shows a requirement of at least one of goods and services to be deployed at a quoted jobsite of a customer, and
wherein the quoted jobsite comprises a jobsite where work is to be performed;
extracting, from the photo image within the online financial application, a list of material items installed at the completed jobsite;
retrieving, from a community data repository and based on the list of material items within the online financial application, supplemental material and labor hour information associated with the list of material items;
generating, based on the list of material items and the supplemental material and labor hour information within the online financial application, the quotation for the quoted jobsite;
receiving, at the server computer from the community data repository, a plurality of quotation adjustments from a plurality of vendors interested in performing a job at the quoted jobsite to form a plurality of adjusted quotations;
sending, by the online financial application, the plurality of adjusted quotations to the remote device; and
receiving, by the online financial application in response to sending the plurality of adjusted quotations to the remote device, a purchase order from the customer to complete the quoted jobsite, the purchase order selecting a vendor from the plurality of vendors to perform the job.

17. The non-transitory computer readable medium of claim 16, the instructions, when executed by the computer processor, comprising functionality for:
assigning, based on an input of the vendor, a community member status to an account maintained by the online financial application on behalf of the vendor; and
verifying, prior to generating the quotation, the community member status, wherein generating the quotation is authorized based on the community member status.

18. The non-transitory computer readable medium of claim 17, when executed by the computer processor, comprising functionality for:
receiving, by the online financial application, an adjustment by the vendor to adjust the supplemental material and labor hour information; and
updating, by the online financial application and based on the adjustment, the quotation to generate an update quotation,
wherein generating the update quotation is authorized based on the community member status, and
wherein the purchase order is based on the updated quotation.

19. The non-transitory computer readable medium of claim 18, when executed by the computer processor, comprising functionality for:
updating, by the online financial application and based on the adjustment, the community data repository,
wherein updating the community data repository is authorized based on the community member status.

20. The non-transitory computer readable medium of claim 19,
wherein extracting the list of material items comprises comparing the photo image to a reference image of a material item in the list of material items to determine a match,
wherein retrieving the supplemental material and labor hour information comprises retrieving a supplemental material item and a labor hour value associated with the material item based on the match, and
wherein updating the community data repository comprised updating the supplemental material item and the labor hour value based on the adjustment.

21. The non-transitory computer readable medium of claim 20, when executed by the computer processor, comprising functionality for:
generating, in response to receiving the purchase order, an invoice comprising a payment amount corresponding to the supplemental material item and the labor hour value;

sending the invoice to the customer for collecting the payment amount; and further updating the community data repository based on the payment amount.

22. The non-transitory computer readable medium of claim 16, further comprising:

calculating corresponding similarity scores for the plurality of vendors, each similarity score representing a measure of similarity among the plurality of vendors;

including, as part of calculating, a similarity between customer information and any given similarity score for a given vendor; and adjusting the plurality of adjusted quotations based on a comparison of the corresponding similarity scores to a threshold.

* * * * *

UNITED STATES PATENT AND TRADEMARK OFFICE
CERTIFICATE OF CORRECTION

PATENT NO. : 10,776,839 B1  
APPLICATION NO. : 14/726216  
DATED : September 15, 2020  
INVENTOR(S) : Santosh Katta et al.

Page 1 of 1

It is certified that error appears in the above-identified patent and that said Letters Patent is hereby corrected as shown below:

In the Claims

Claim 6, Column 15, beginning on Line 64 and ending on Line 65, the word "comprised" should read -- comprises --.

Claim 14, Column 17, beginning on Line 27 and ending on Line 28, the word "comprised" should read -- comprises --.

Claim 16, Column 17, Line 45, the line reads "remote device, a photo image of a completed jobsite," but should read -- remote device of a completed jobsite, --.

Claim 20, Column 18, beginning on Line 57 and ending on Line 58, the word "comprised" should read -- comprises --.

Signed and Sealed this  
Fifteenth Day of December, 2020

Andrei Iancu  
*Director of the United States Patent and Trademark Office*